United States Patent
Kim et al.

(10) Patent No.: US 10,059,260 B2
(45) Date of Patent: Aug. 28, 2018

(54) METHOD OF AND SYSTEM FOR GENERATING VIRTUAL ENGINE SOUND

(71) Applicant: HYUNDAI MOTOR COMPANY, Seoul (KR)

(72) Inventors: Seong Hyeon Kim, Anyang-si (KR); Dong Chul Park, Anyang-si (KR); Eun Soo Jo, Hwaseong-si (KR); Ki Woong Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 25 days.

(21) Appl. No.: 14/558,526

(22) Filed: Dec. 2, 2014

(65) Prior Publication Data
US 2016/0046234 A1  Feb. 18, 2016

(30) Foreign Application Priority Data
Aug. 18, 2014  (KR) .................. 10-2014-0106921

(51) Int. Cl.
H04B 1/00 (2006.01)
B60Q 5/00 (2006.01)
G10K 15/02 (2006.01)

(52) U.S. Cl.
CPC .............. *B60Q 5/00* (2013.01); *G10K 15/02* (2013.01)

(58) Field of Classification Search
None
See application file for complete search history.

(56) References Cited

U.S. PATENT DOCUMENTS

| | | | | |
|---|---|---|---|---|
| 5,571,239 A | * | 11/1996 | Kameda | F01N 1/065 123/184.21 |
| 2005/0259830 A1 | * | 11/2005 | Vaishya | G10K 15/02 381/71.4 |
| 2011/0206213 A1 | * | 8/2011 | Sakamoto | G10K 11/1782 381/71.4 |
| 2012/0177214 A1 | * | 7/2012 | Hera | G10K 15/02 381/73.1 |
| 2014/0169578 A1 | * | 6/2014 | Jung | G10K 11/178 381/71.4 |
| 2015/0358725 A1 | * | 12/2015 | Hera | H04R 1/22 381/102 |

FOREIGN PATENT DOCUMENTS

| | | |
|---|---|---|
| JP | 2011-215437 A | 10/2011 |
| JP | 4888386 B2 | 2/2012 |
| KR | 10-2013-0050027 A | 5/2013 |

OTHER PUBLICATIONS

"Sine Wave." Wikipedia. Jul. 18, 2014.*

* cited by examiner

*Primary Examiner* — James Mooney
(74) *Attorney, Agent, or Firm* — McDermott Will & Emery LLP

(57) ABSTRACT

A method for generating a virtual engine sound and a virtual engine sound generating system using the same involve determining a basic waveform of a virtual engine sound based on engine variables including an engine RPM, primarily correcting a basic level of the basic waveform based on environmental variables to determine a primarily corrected waveform, secondarily correcting the primarily corrected waveform based on reaction variables to determine a final waveform, and generating a virtual engine sound having the final waveform through a sound generation device.

12 Claims, 3 Drawing Sheets

FIG. 3
[RELATED ART]
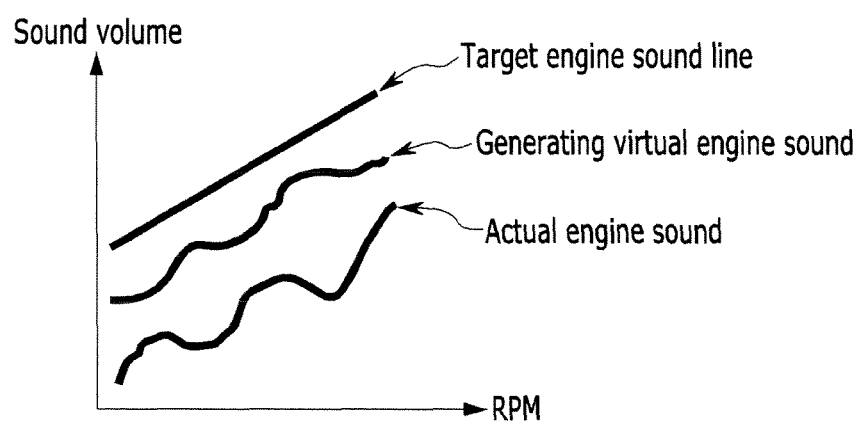
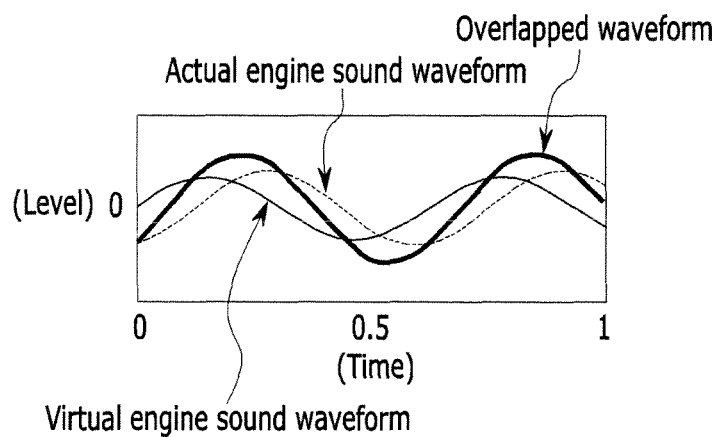

METHOD OF AND SYSTEM FOR GENERATING VIRTUAL ENGINE SOUND

CROSS-REFERENCE TO RELATED APPLICATION

This application claims priority to and benefit of the Korean Patent Application No. 10-2014-0106921 filed in the Korean Intellectual Property Office on Aug. 18, 2014, the entire contents of which are incorporated herein by reference.

BACKGROUND OF THE DISCLOSURE (a) Field

The disclosure herein relates to a method for generating a virtual engine sound and to a virtual engine sound generating system using the same. More particularly, the disclosure relates to a method for generating a virtual engine sound which is time synchronized with a waveform of an actual engine sound and is robust to an environmental change; and a virtual engine sound generating system using the same.

(b) Description of the Related Art

In order to change the tone of an actual engine sound which is generated as an engine is operated, an ASD (Active Sound Design) method is under research. By overlapping the virtual engine sound on the actual engine sound, a sensory quality related to the engine sound may be improved.

A related art process for generating the virtual engine sound will be described, with reference to FIG. 3.

FIG. 3 illustrates a graph for describing a related art process for generating the virtual engine sound.

Referring to FIG. 3, a controller has an actual engine sound line which varies with an engine RPM stored therein. The actual engine sound line varied with the engine RPM may be set in advance with an experiment taking a specification of the engine into account. The controller has a target engine sound line in which sound volume increases according to the engine RPM stored therein. The target engine sound line may be preset to a value a person of an ordinary skill in the art may determine to be desirable. Alternatively, the target engine sound line may be set to a value the user desires. The controller determines the sound volume of the virtual engine sound matched to the virtual engine sound line for generating the same.

However, in a particular engine RPM state, if the waveform of the actual engine sound having a frequency at the particular engine RPM is not time synchronized with the waveform of the virtual engine sound having that frequency, a problem may be caused, in which the sound volume matched to the target engine sound line fails to output due to destructive interference and constructive interference.

Moreover, the sound volume of the actual engine sound varies with environmental changes, such as temperature, duration of use and degradation of the vehicle. However, since the actual engine sound line is preset by experiment at room temperature (For an example, 20° C.), a problem may be caused, in which the sound volume matched to the target engine sound line fails to output.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to describe a method for generating a virtual engine sound, and a virtual engine sound generating system using the same, having advantages of generating a virtual engine sound which is time synchronized with a waveform of an actual engine sound, and is robust to environmental change.

Accordingly, an object of the present invention is to provide a method for generating a virtual engine sound for generating a virtual engine sound which is time synchronized with a waveform of an actual engine sound and is robust to environmental change; and a virtual engine sound generating system using the same.

According to an exemplary embodiment of the present invention, a method for generating a virtual engine sound includes determining a basic waveform of a virtual engine sound based on engine variables including engine RPM, primarily correcting a basic level of the basic waveform based on environmental variables to determine a primarily corrected waveform, secondarily correcting the primarily corrected waveform based on reaction variables to determine a final waveform, and generating a virtual engine sound having the final waveform through a speaker or other sound generating device.

The engine variables may further include phase angle of a crankshaft, and the basic waveform may be a waveform time synchronized with a waveform of an actual engine sound.

The basic waveform may be expressed as $L \times \sin(\omega t + \emptyset)$, where, L denotes the basic level determined based on the present engine RPM, $\omega$ denotes an angular frequency determined based on a frequency of the present engine RPM, and $\emptyset$ denotes a phase angle delay value determined based on the phase angle of the crankshaft.

The environmental variables may include at least one of coolant temperature of an engine, intake temperature, engine oil temperature and transmission oil temperature.

The reaction variables may include at least one of the position of an accelerator pedal, engine torque and vehicle speed.

In the primarily correcting of the basic level of the basic waveform, a correction level of the primarily corrected waveform may be determined by multiplying an environmental correction coefficient set according to the environmental variables to the basic level.

The environmental correction coefficient may be set as a value varied with the engine RPM.

In the secondarily correcting of the primarily corrected waveform, a final level of the final waveform may be determined by applying a correction curve set based on the reaction variables to a corrected level of the primarily corrected waveform.

According to an exemplary embodiment of the present invention, a method for generating a virtual engine sound may include determining a basic waveform of a virtual engine sound based on engine variables including engine RPM, primarily correcting a basic level of the basic waveform based on reaction variables to determine a primarily corrected waveform, secondarily correcting the primarily corrected waveform based on environmental variables to determine a final waveform, and generating a virtual engine sound having the final waveform through a speaker or other sound generating device.

The engine variables may further include phase angle of a crankshaft, and the basic waveform may be a waveform time synchronized with a waveform of an actual engine sound.

The basic waveform may be expressed as $L \times \sin(\omega t + \emptyset)$, where, L denotes the basic level determined based on the present engine RPM, $\omega$ denotes an angular frequency determined based on frequency of the present engine RPM, and θ denotes a phase angle delay value determined based on the phase angle of the crankshaft.

The environmental variables may include at least one of a coolant temperature of an engine, an intake temperature, an engine oil temperature and a transmission oil temperature.

The reaction variables may include at least one of the position of an accelerator pedal, engine torque and vehicle speed.

In the primarily correcting of the basic level of the basic waveform, a corrected level of the primarily corrected waveform may be determined by applying a correction curve set based on the reaction variables to the basic level.

In the secondarily correcting of the primarily corrected waveform, a final level of the final waveform may be determined by multiplying an environmental correction coefficient set according to the environmental variables to a corrected level of the primarily corrected waveform.

The environmental correction coefficient may be set as a value varied with the engine RPM.

According to an exemplary embodiment of the present invention, a virtual engine sound generating system may include a data detector for detecting engine variables, environmental variables and reaction variables, a controller for determining a waveform of the virtual engine sound based on the engine variables, the environmental variables and the reaction variables, and a speaker or other sound generating device for generating the virtual engine sound under control of the controller, wherein the engine variables may include an engine RPM, the environmental variables may include at least one of a coolant temperature of an engine, an intake temperature, an engine oil temperature and a transmission oil temperature, and the controller may determine a basic waveform of the virtual engine sound based on the engine variables, may correct a basic level of the basic waveform based on the environmental variables and the reaction variables to determine a final waveform.

The engine variables may further include phase angle of a crankshaft, the reaction variables may include at least one of the position of an accelerator pedal, engine torque and vehicle speed, and the basic waveform may be a waveform time synchronized with a waveform of an actual engine sound.

The controller may primarily correct the basic level of the basic waveform based on the environmental variables to determine a primarily corrected waveform, and may secondarily correct the primarily corrected waveform based on reaction variables to determine the final waveform.

The controller may primarily correct the basic level of the basic waveform based on reaction variables to determine a primarily corrected waveform, and may secondarily correct the primarily corrected waveform based on the environmental variables to determine the final waveform.

Thus, according to an exemplary embodiment of the present invention, the waveform of the virtual engine sound can be time synchronized with the waveform of the actual engine sound. And, generation of the virtual engine sound taking environmental variables into account permits generation of a virtual engine sound that is robust to environmental change.

BRIEF DESCRIPTION OF THE DRAWINGS

FIG. 3 illustrates a graph for describing a related art process for generating the virtual engine sound.

DETAILED DESCRIPTION OF THE EMBODIMENTS

Figure 1:
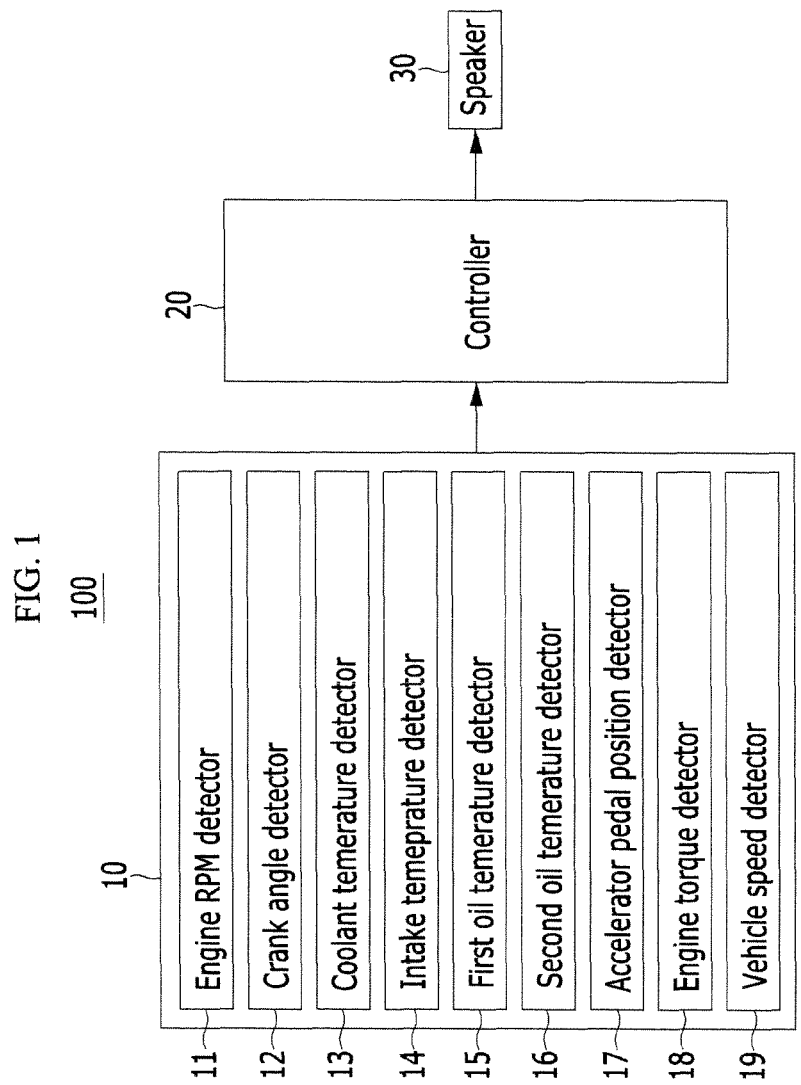
FIG. 1 illustrates a block diagram of a virtual engine sound generating system in accordance with an exemplary embodiment of the present invention.

The present invention will be described more fully hereinafter with reference to the accompanying drawings, in which an exemplary embodiment of the invention is shown. However, the present invention is not limited to the exemplary embodiment described herein, but may be embodied in other modes.

In order to describe the present invention clearly, portions of the description not relevant to the description are omitted, and throughout the specification, identical or similar elements will be given the same reference numbers.

And, elements shown in the drawings are shown at will for convenience of description, and the present invention is not limited to the drawings.

In addition, throughout the specification, unless explicitly described to the contrary, the word "comprise" and variations such as "comprises" or "comprising", will be understood to imply the inclusion of stated elements but not the exclusion of any other elements.

FIG. 1 illustrates a block diagram of a virtual engine sound generating system in accordance with an exemplary embodiment of the present invention.

Referring to FIG. 1, the virtual engine sound generating system 100 includes a data detector 10, a controller 20, and a speaker or other sound generating device 30.

The data detector 10 detects data for generating the virtual engine sound, and the data detected by the data detector 10 is transmitted to the controller 20. The data detector 10 may include an engine RPM detector 11, a crank angle detector 12, a coolant temperature detector 13, an intake temperature detector 14, a first oil temperature detector 15, a second oil temperature detector 16, an accelerator pedal position detector 17, an engine torque detector 18 and a vehicle speed detector 19.

The engine RPM detector 11 is mounted at an output shaft of the engine. The engine RPM detector 11 detects RPM of the engine and transmits a signal corresponding thereto to the controller 20.

The crank angle detector 12 detects a phase angle of the crankshaft and transmits a signal corresponding thereto to the controller 20. Instead of the crank angle detector 12, a cam angle detector may be used. Accordingly, in the specification and the claims presented herein, it is to be understood that the crank angle detector 12 includes the cam angle detector, and the phase angle of the crank shaft includes the phase angle of the camshaft.

The coolant temperature detector 13 detects a coolant temperature of the engine and transmits a signal corresponding thereto to the controller 20.

The intake temperature detector 14 detects an intake temperature and transmits a signal corresponding thereto to the controller 20.

The first oil temperature detector 15 detects the temperature of oil used in the engine and transmits a signal corresponding thereto to the controller 20.

The second oil temperature detector 16 detects the temperature of oil used in a transmission and also transmits a signal corresponding thereto to the controller 20.

The accelerator pedal position detector 17 detects the position of an accelerator pedal (pressed degree of the accelerator pedal) and transmits a signal corresponding thereto to the controller 20. If the accelerator pedal is pressed fully, the position of the accelerator pedal is 100%, and if the accelerator pedal is not pressed, the position of the accelerator pedal is 0%. Instead of the accelerator pedal position detector 17, a throttle valve opening detector of a throttle valve mounted to an intake passage may be used. Accordingly, in the specification and the claims herein, it is to be understood that the accelerator pedal position detector 17 includes the throttle valve opening detector, and the position of the accelerator pedal includes the opening of the throttle valve.

The engine torque detector 18 detects engine torque. The engine torque may be detected by a sensor, or may be calculated by using engine control variables, such as engine RPM, position of the accelerator pedal, vehicle speed, fuel injection rate, and so on.

The vehicle speed detector 19 detects vehicle speed and transmits a signal corresponding thereto to the controller 20.

The controller 20 determines the phase of a waveform of the virtual engine sound and level of the waveform corresponding to the volume of the virtual engine sound based on the data detected by the data detector 10. For the above purpose, the controller 20 may be implemented with at least one microprocessor executed by a predetermined program. The predetermined program may include a series of commands for performing each step included in a method for generating a virtual engine sound in accordance with an exemplary embodiment of the present invention, to be described later.

The controller 20 may include a memory for storing a sound source of the virtual engine sound, a codec for converting a digital sound source signal to an analog sound source signal and an audio amplifier for amplifying the analog sound source signal from the codec. Since the memory, the codec and the amplifier are apparent to a person of an ordinary skill in the art, detailed description thereof will be omitted.

The controller 20 generates the virtual engine sound with the speaker or other device 30 mounted to a predetermined position of the vehicle.

A method for generating a virtual engine sound in accordance with an exemplary embodiment of the present invention will be described with reference to FIG. 2, in detail.

Figure 2:
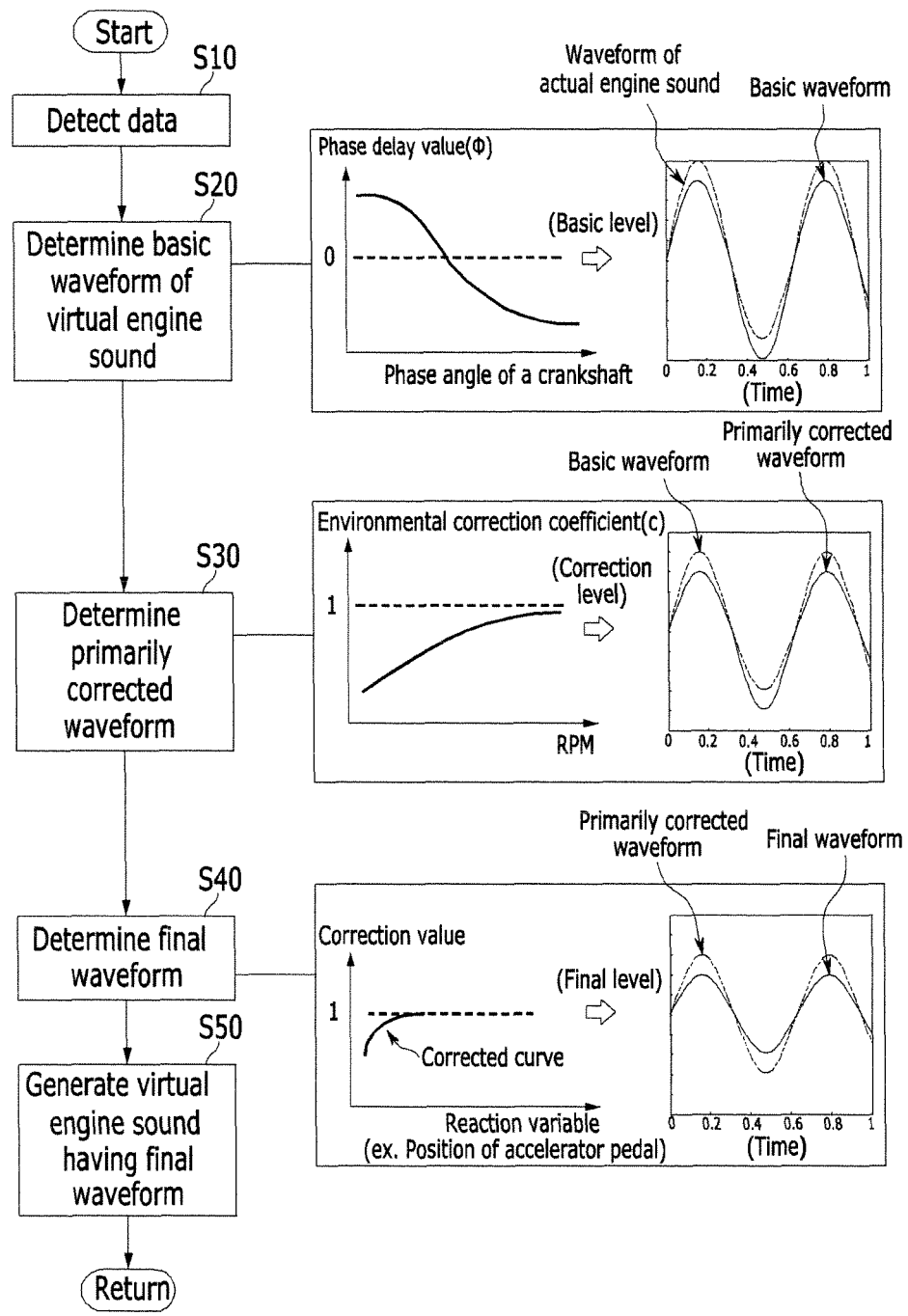
FIG. 2 illustrates a flow chart showing the steps of a method for generating a virtual engine sound in accordance with an exemplary embodiment of the present invention.

FIG. 2 illustrates a flow chart showing the steps of a method for generating a virtual engine sound in accordance with an exemplary embodiment of the present invention.

Referring to FIG. 2, the method for generating a virtual engine sound in accordance with an exemplary embodiment of the present invention starts with detecting a data for generating a virtual engine sound (S10). The data includes engine variables, environmental variables and reaction variables.

That is, an engine RPM detector 11 may detect engine RPM, crank angle detector 12 may detect a crankshaft phase angle, a coolant temperature detector 13 may detect a coolant temperature of the engine, intake temperature detector 14 may detect an intake temperature, a first oil temperature detector 15 may detect an engine oil temperature, a second oil temperature detector 16 may detect a transmission oil temperature, accelerator pedal position detector 17 may detect a position of an accelerator pedal, engine torque detector 18 may detect an engine torque, and vehicle speed detector 19 may detect vehicle speed.

If the data detector 10 detects and transmits the data to the controller 20, the controller 20 determines a basic waveform of the virtual engine sound based on the engine variables (S20). The engine variables may include engine RPM and phase angle of the crankshaft.

The basic waveform may be expressed as $L \times \sin(\omega t + \emptyset)$. Where, L denotes a basic level determined based on the present engine RPM, $\omega$ denotes an angular frequency determined based on the frequency of the present engine RPM, and $\emptyset$ denotes a phase angle delay value determined based on phase angle of the crankshaft. The controller 20 may store the phase delay value that corresponds to the phase angle of the crankshaft in a lookup table. However, if the basic waveform of the virtual engine sound is determined based only on the engine RPM, the basic waveform may be expressed as $L \times \sin(\omega t)$.

If the phase delay value is not taken into account, the waveform of the virtual engine sound is not time synchronized with the waveform of the actual engine sound, and destructive interference and constructive interference take place. However, if phase delay value is taken into account, the waveform of the virtual engine sound time synchronized with the waveform of the actual engine sound may be obtained.

The controller 20 primarily corrects the basic level (L) based on the environment variables, to determine a primarily corrected waveform (S30). The environmental variables may include at least one of coolant temperature of the engine, intake temperature, engine oil temperature and transmission oil temperature. A corrected level of the primarily corrected waveform may be determined by multiplying an environmental correction coefficient (C) set according to the environmental variables to the basic level (L). The controller 20 may store the environmental correction coefficient (C) that corresponds to the environmental variables in a lookup table form. Accordingly, the primarily corrected waveform may be expressed as $C \times L = \sin(\omega t + \emptyset)$. The environmental correction coefficient (C) may also be set as a value varied with engine RPM. However, if the basic waveform of the virtual engine sound is determined based only on the engine RPM, the primarily corrected waveform may be expressed as $C \times L \times \sin(\omega t)$.

If the environmental variables are not taken into account, the sound volume of the engine sound recognized by passengers will vary with environmental change. However, if the environmental variables are taken into account, a virtual engine sound robust against environmental change may be obtained.

The controller 20 may secondarily correct the primarily corrected waveform based on the reaction variables to determine a final waveform (S40). The reaction variable may include at least one of the position of the accelerator pedal, engine torque and vehicle speed. The reaction variable may be a single variable which is one of the position of the accelerator pedal, engine torque and vehicle speed or a composite variable which is a combination of two or more of the variables.

A final level of the final waveform may be determined by applying a correction curve set based on the reaction variables to a corrected level of the primarily corrected waveform. The controller 20 may store the correction curve that corresponds to the reaction variables in a lookup table. For example, if the position of the accelerator pedal is low, the correction curve may be set by a person of an ordinary skill in the art for generating the virtual engine sound at a low sound volume.

The controller 20 generates a virtual engine sound having the final waveform through the speaker or other sound generating device 30 (S50). The final waveform is time synchronized with the waveform of the actual engine sound and robust against environmental change.

Although the specification illustrates that the controller 20 primarily corrects the basic level (L) based on environmental variables to determine the primarily corrected waveform, and secondarily corrects the primarily corrected waveform based on the reaction variables to determine the final waveform, the present invention is not so limited. That is, step S30 and the S40 may be reversed in order. In this case, the controller 20 primarily corrects the basic level (L) based on the reaction variables to determine the primarily corrected waveform, and secondarily corrects the primarily corrected waveform based on the environmental variables to determine the final waveform. That is, the corrected level of the primarily corrected waveform in step S30 may be determined by applying a predetermined correction curve based on the reaction variables to the basic level (L). And, in step S40, the final level of the final waveform may be determined by multiplying an environmental correction coefficient (C) set according to environmental variables to the correction level of the primarily corrected waveform.

Thus, according to an exemplary embodiment of the present invention, the waveform of the virtual engine sound may be time synchronized with the waveform of the actual engine sound, and by generating the virtual engine sound taking the environmental variables into account, a virtual engine sound can be generated, which is robust against environmental change.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a virtual engine sound, comprising:
    determining a basic waveform of a virtual engine sound based on engine variables including an engine RPM;
    primarily correcting a basic level of the basic waveform based on environmental variables to determine a primarily corrected waveform;
    secondarily correcting the primarily corrected waveform based on reaction variables to determine a final waveform; and
    generating a virtual engine sound having the final waveform through a sound generating component,
    wherein the engine variables further include a phase angle of a crankshaft, and the basic waveform is a waveform time synchronized with a waveform of an actual engine sound by using a phase angle delay value determined based on the phase angle of the crankshaft, and
    wherein, in the primarily correcting of the basic level of the basic waveform, a corrected level of the primarily corrected waveform is determined by multiplying the basic level with an environmental correction coefficient set according to the environmental variables, and
    wherein the basic waveform is expressed as $L \times \sin(\omega t + \emptyset)$, where, L denotes the basic level determined based on a present engine RPM, $\omega$ denotes an angular frequency determined based on a frequency of the present engine RPM, and $\emptyset$ denotes the phase angle delay value determined based on the phase angle of the crankshaft.

2. The method of claim 1, wherein the environmental variables include at least one of a coolant temperature of an engine, an intake temperature, an engine oil temperature and a transmission oil temperature.

3. The method of claim 1, wherein the reaction variables include at least one of a position of an accelerator pedal, an engine torque and a vehicle speed.

4. The method of claim 1, wherein the environmental correction coefficient is set as a value varied with engine RPM.

5. The method of claim 1, wherein, in the secondarily correcting of the primarily corrected waveform, a final level of the final waveform is determined by applying a correction curve set based on the reaction variables to the corrected level of the primarily corrected waveform.

6. A method for generating a virtual engine sound comprising:
    determining a basic waveform of a virtual engine sound based on engine variables including an engine RPM;
    primarily correcting a basic level of the basic waveform based on reaction variables to determine a primarily corrected waveform;
    secondarily correcting the primarily corrected waveform based on environmental variables to determine a final waveform; and
    generating a virtual engine sound having the final waveform through a sound reproduction device,
    wherein the engine variable further includes a phase angle of a crankshaft, and the basic waveform is a waveform time synchronized with a waveform of an actual engine sound by using a phase angle delay value determined based on the phase angle of the crankshaft, and
    wherein, in the secondarily correcting of the primarily corrected waveform, a final level of the final waveform is determined by multiplying a corrected level of the primarily corrected waveform with an environmental correction coefficient set according to the environmental variables, and
    wherein the basic waveform is expressed as $L \times \sin(\omega t + \emptyset)$, where, L denotes the basic level determined based on a present engine RPM, $\omega$ denotes an angular frequency determined based on a frequency of the present engine RPM, and $\emptyset$ denotes the phase angle delay value determined based on the phase angle of the crankshaft.

7. The method of claim 6, wherein the environmental variables include at least one of a coolant temperature of an engine, an intake temperature, an engine oil temperature and a transmission oil temperature.

8. The method of claim 6, wherein the reaction variables include at least one of a position of an accelerator pedal, an engine torque and a vehicle speed.

9. The method of claim 6, wherein, in the primarily correcting of the basic level of the basic waveform, the corrected level of the primarily corrected waveform is determined by applying a correction curve set based on the reaction variables to the basic level.

10. The method of claim 6, wherein the environmental correction coefficient is set as a value varied with the engine RPM.

11. A virtual engine sound generating system comprising:
    a data detector for detecting engine variables, environmental variables and reaction variables;
    a controller for determining a waveform of the virtual engine sound based on the engine variables, the environmental variables and the reaction variables; and
    a sound reproduction device for generating the virtual engine sound under control of the controller, wherein the engine variables include an engine RPM,
the environmental variables include at least one of a coolant temperature of an engine, an intake temperature, an engine oil temperature and a transmission oil temperature, and
the controller determines a basic waveform of the virtual engine sound based on the engine variables, corrects a basic level of the basic waveform based on the environmental variables and the reaction variables to determine a final waveform,
wherein the controller is configured to primarily correct the basic level of the basic waveform based on the environmental variables to determine a primarily corrected waveform, by multiplying the basic level with an environmental correction coefficient set according to the environmental variables, and configured to secondarily correct the primarily corrected waveform based on the reaction variables to determine the final waveform,
wherein the engine variables further include a phase angle of a crankshaft,
wherein the reaction variables include at least one of a position of an accelerator pedal, an engine torque and a vehicle speed,
wherein the basic waveform is a waveform time synchronized with a waveform of an actual engine sound by using a phase angle delay value determined based on the phase angle of the crankshaft, and
wherein the basic waveform is expressed as $L \times \sin(\omega t + \emptyset)$, where, L denotes the basic level determined based on a present engine RPM, $\omega$ denotes an angular frequency determined based on a frequency of the present engine RPM, and $\emptyset$ denotes the phase angle delay value determined based on the phase angle of the crankshaft.

12. A virtual engine sound generating system comprising:
a data detector for detecting engine variables, environmental variables and reaction variables;
a controller for determining a waveform of the virtual engine sound based on the engine variables, the environmental variables and the reaction variables; and
a sound reproduction device for generating the virtual engine sound under control of the controller,
wherein the engine variables include an engine RPM,
the environmental variables include at least one of a coolant temperature of an engine, an intake temperature, an engine oil temperature and a transmission oil temperature, and
the controller determines a basic waveform of the virtual engine sound based on the engine variables, corrects a basic level of the basic waveform based on the environmental variables and the reaction variables to determine a final waveform,
wherein the controller is configured to primarily correct the basic level of the basic waveform based on the reaction variables to determine a primarily corrected waveform, and configured to secondarily correct the primarily corrected waveform based on the reaction variables to determine the final waveform, by multiplying a corrected level of the primarily corrected waveform with an environmental correction coefficient set according to the environmental variables,
wherein the engine variables further include a phase angle of a crankshaft,
wherein the reaction variables include at least one of a position of an accelerator pedal, an engine torque and a vehicle speed,
wherein the basic waveform is a waveform time synchronized with a waveform of an actual engine sound by using a phase angle delay value determined based on the phase angle of the crankshaft, and
wherein the basic waveform is expressed as $L \times \sin(\omega t + \emptyset)$, where, L denotes the basic level determined based on a present engine RPM, $\omega$ denotes an angular frequency determined based on a frequency of the present engine RPM, and $\emptyset$ denotes the phase angle delay value determined based on the phase angle of the crankshaft.

* * * * *